(12) United States Patent
McGrath

(10) Patent No.: US 6,463,517 B1
(45) Date of Patent: Oct. 8, 2002

(54) APPARATUS AND METHOD FOR GENERATING VIRTUAL ADDRESSES FOR DIFFERENT MEMORY MODELS

(75) Inventor: Kevin J. McGrath, Los Gatos, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 334 days.

(21) Appl. No.: 09/595,576

(22) Filed: Jun. 15, 2000

(51) Int. Cl.[7] ................................................. G06F 12/10
(52) U.S. Cl. ........................................ 711/208; 711/209
(58) Field of Search ................................. 711/202, 203, 711/206, 207, 208, 209

(56) References Cited

U.S. PATENT DOCUMENTS

| | | | |
|---|---|---|---|
| 5,584,005 A | * 12/1996 | Miyaoku et al. | ............ 395/416 |
| 5,826,074 A | * 10/1998 | Blomgren | .................. 395/581 |
| 5,854,913 A | * 12/1998 | Goetz et al. | ................ 395/386 |
| 6,145,016 A | * 11/2000 | Lai et al. | ....................... 710/4 |

OTHER PUBLICATIONS

*Intel Architecture Software Developer's Manual, vol. I: Basic Architecture*, Intel® Corporation, 1997, Chapter 3, pp. 1–9; Chapter 5, pp. 6–7.

* cited by examiner

Primary Examiner—Kevin L. Ellis
(74) Attorney, Agent, or Firm—Conley, Rose & Tayon, PC; Lawrence J. Merkel

(57) ABSTRACT

An apparatus and method for generating virtual addresses for different types of memory models using an existing address generation unit. A processor can be configured to operate using either a segmented memory model or a flat memory model according to an operating mode. When the processor is operating using a segmented memory model, it can use the base address of a segment register to calculate a virtual address. When the processor is operating using a flat memory model, it can use the base address of a pseudo segment register to calculate a virtual address. In this manner, the processor can use existing address generation techniques to generate a virtual address for either a segmented memory model or a flat memory model.

20 Claims, 10 Drawing Sheets

| LME | CS L Bit | CS D Bit | Operating Mode |
|---|---|---|---|
| 0 | x | 0 | 16 Bit Mode |
| 0 | x | 1 | 32 Bit Mode |
| 1 | 0 | 0 | 16 Bit Compatibility Mode |
| 1 | 0 | 1 | 32 Bit Compatibility Mode |
| 1 | 1 | 0 | 32/64 Mode |
| 1 | 1 | 1 | Reserved |

70

APPARATUS AND METHOD FOR GENERATING VIRTUAL ADDRESSES FOR DIFFERENT MEMORY MODELS

BACKGROUND OF THE INVENTION

1. Field of the Invention

This invention is related to the field of processors and, more particularly, to generating addresses in processors.

2. Description of the Related Art

The x86 architecture (also known as the IA-32 architecture) has enjoyed widespread acceptance and success in the marketplace. Accordingly, it is advantageous to design processors according to the x86 architecture. Such processors may benefit from the large body of software written to the x86 architecture (since such processors may execute the software and thus computer systems employing the processors may enjoy increased acceptance in the market due to the large amount of available software).

As computer systems have continued to evolve, 64 bit address size (and sometimes operand size) has become desirable. A larger address size allows for programs having a larger memory footprint (the amount of memory occupied by the instructions in the program and the data operated upon by the program) to operate within the memory space. A larger operand size allows for operating upon larger operands, or for more precision in operands. More powerful applications and/or operating systems may be possible using 64 bit address and/or operand sizes.

Unfortunately, the x86 architecture is limited to a maximum 32 bit operand size and 32 bit address size. The operand size refers to the number of bits operated upon by the processor (e.g. the number of bits in a source or destination operand). The address size refers to the number of bits in an address generated by the processor. Thus, processors employing the x86 architecture may not serve the needs of applications which may benefit from 64 bit address or operand sizes.

The x86 architecture can operate using a segmented memory model. When using address sizes of 64 bits, however, a flat memory model may be desirable. The process of generating virtual addresses in a flat memory model can differ from the process of generating virtual addresses in a segmented memory model. Accordingly, for a processor to be able to operate using a flat memory model and a segmented memory model, it must be able to generate virtual addresses for either type of model. It would be desirable for a processor to be able to generate virtual addresses for either a flat memory model or a segmented memory model using existing address generation techniques.

SUMMARY OF THE INVENTION

The problems outlined above are in large part solved by an apparatus and method for generating virtual addresses for different types of memory models using an existing address generation unit. A processor can be configured to operate using either a segmented memory model or a flat memory model according to an operating mode. When the processor is operating using a segmented memory model, it can use the base address of a segment register to calculate a virtual address. When the processor is operating using a flat memory model, it can use the base address of a pseudo segment register to calculate a virtual address. In one embodiment, this base address can be zero. In this manner, the processor can use existing address generation techniques to generate a virtual address for either a segmented memory model or a flat memory model. More particularly, a segment register and a pseudo segment register can be located in a register file such that a processor can read a value from the register file to perform address generation regardless of the operating mode.

In one embodiment, a processor can include a segment register that stores a segment descriptor and a pseudo segment register that stores a base address. The segment descriptor includes a base address, a first operating mode indication, and a second operating mode indication. The first and second operating mode indications can be used by the processor along with an enable indication in a control register to establish an operating mode. The operating mode can indicate whether the processor is currently using a segmented memory model or a flat memory model. If the processor is using a segmented memory model, it can convey the base address from the segment register to an address generation unit to generate a virtual address. If the processor is using a flat memory model, it can convey the base address from the pseudo segment register to the address generation unit to generate a virtual address.

The use of the apparatus and method described herein may advantageously allow a processor to generate virtual addresses for either a segmented memory model or a flat memory model using existing address generation techniques.

BRIEF DESCRIPTION OF THE DRAWINGS

Other objects and advantages of the invention will become apparent upon reading the following detailed description and upon reference to the accompanying drawings in which.

Figure 1:
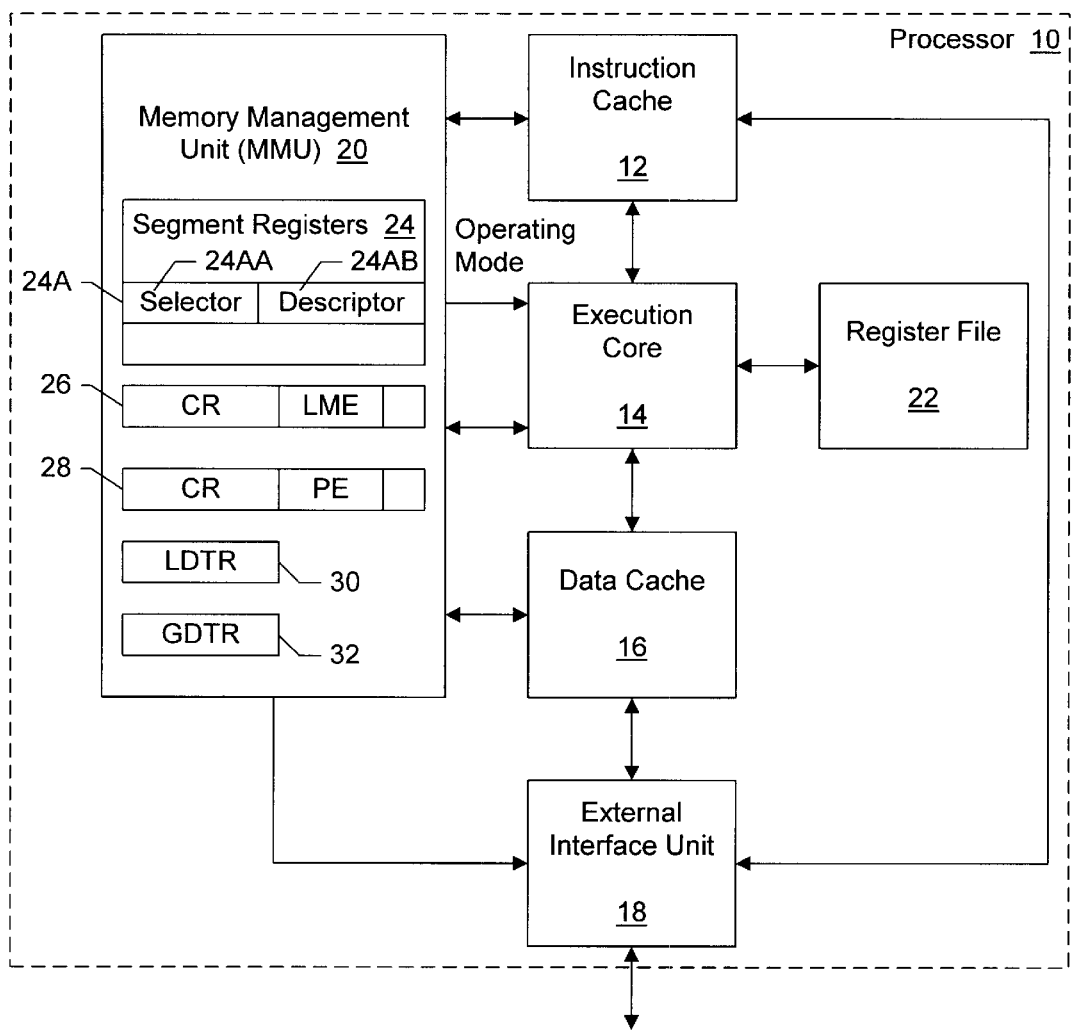
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to FIG. 1, a block diagram illustrating one embodiment of a processor 10 is shown. Other embodiments are possible and contemplated. In the embodiment of FIG. 1, processor 10 includes an instruction cache 12, an execution core 14, a data cache 16, an external interface unit 18, a memory management unit (MMU) 20, and a register file 22. In the illustrated embodiment, MMU 20 includes a set of segment registers 24, a first control register 26, a second control register 28, a local descriptor table register (LDTR) 30, and a global descriptor table register (GDTR) 32. Instruction cache 12 is coupled to external interface unit 18, execution core 14, and MMU 20. Execution core 14 is further coupled to MMU 20, register file 22, and data cache 16. Data cache 16 is further coupled to MMU 20 and external interface unit 18. External interface unit 18 is further coupled to MMU 20 and to an external interface.

Generally speaking, processor 10 employs a processor architecture compatible with the x86 architecture and including additional architectural features to support 64 bit processing. Processor 10 is configured to establish an operating mode in response to information stored in a code segment descriptor corresponding to the currently executing code and further in response to one or more enable indications stored in one or more control registers. As used herein, an "operating mode" specifies default values for various programmably selectable processor attributes. For example, the operating mode may specify a default operand size and a default address size. The default operand size specifies the number of bits in an operand of an instruction, unless an instruction's encoding overrides the default. The default address size specifies the number of bits in an address of a memory operand of an instruction, unless an instruction's encoding overrides the default. The default address size specifies the size of at least the virtual address of memory operands, and may also specify the size of the physical address. Alternatively, the size of the physical address may be independent of the default address size and may instead be dependent on the LME bit described below (e.g. the physical address may be 32 bits if the LME bit is clear and an implementation-dependent size greater than 32 bits and less than 64 bits if the LME bit is set) or on another control bit (e.g. the physical address extension bit, or PAE bit, in another control register). As used herein, a "virtual address" is an address generated prior to translation through an address translation mechanism (e.g. a paging mechanism) to a "physical address", which is the address actually used to access a memory. Additionally, as used herein, a "segment descriptor" is a data structure created by software and used by the processor to define access control and status for a segment of memory. A "segment descriptor table" is a table in memory having multiple entries, each entry capable of storing a segment descriptor.

In the illustrated embodiment, MMU 20 generates an operating mode and conveys the operating mode to execution core 14. Execution core 14 executes instructions using the operating mode. More particularly, execution core 14 fetches operands having the default operand size from register file 22 or memory (through data cache 16, if the memory operands are cacheable and hit therein, or through external interface unit 18 if the memory operands are noncacheable or miss data cache 16) unless a particular instruction's encoding overrides the default operand size, in which case the overriding operand size is used. Similarly, execution core 14 generates addresses of memory operands, wherein the addresses have the default address size unless a particular instruction's encoding overrides the default address size, in which case the overriding address size is used. In other embodiments, the information used to generate the operating mode may be shadowed locally in the portions of processor 10 which use the operating mode (e.g. execution core 14), and the operating mode may be determined from the local shadow copies.

As mentioned above, MMU 20 generates the operating mode responsive to a code segment descriptor corresponding to the code being executed and further responsive to one or more values in control registers. Information from the code segment descriptor is stored in one of the segment registers 24 (a register referred to as CS, or code segment). Additionally, control register 26 stores an enable indication (LME) which is used to enable an operating mode in which the default address size is greater than 32 bits ("32/64 mode") as well as certain compatibility modes for the 32 bit and 16 bit operating modes. The default operand size may be 32 bits in 32/64 mode, but instructions may override the default 32 bit operand size with a 64 bit operand size when desired. If the LME indication is in an enabled state, then 32/64 mode may be used in addition to 32 bit and 16 bit modes. If the LME indication is in a disabled state, then 32/64 mode is disabled. In one embodiment, the default address size in 32/64 mode may be implementation-dependent but may be any value up to and including 64 bits. Furthermore, the size of the virtual address may differ in a given implementation from the size of the physical address in that implementation.

It is noted that enable indications may be described herein as bits with the enabled state being the set state of the bit and the disabled state being the cleared state of the bit. However, other encodings are possible, including encodings in which multiple bits are used and encodings in which the enabled state is the clear state and the disabled state is the set state. Accordingly, the remainder of this description may refer to the LME indication in control register 26 as the LME bit, with the enabled state being set and the disabled state being clear. However, other encodings of the LME indication are contemplated, as set forth above.

Segment registers 24 store information from the segment descriptors currently being used by the code being executed by processor 10. As mentioned above, CS is one of segment registers 24 and specifies the code segment of memory. The code segment stores the code being executed. Other segment registers may define various data segments (e.g. a stack data segment defined by the SS segment register, and up to four data segments defined by the DS, ES, FS, and GS segment registers). FIG. 1 illustrates the contents of an exemplary segment register 24A, including a selector field 24AA and a descriptor field 24AB. Selector field 24AA is loaded with a segment selector to activate a particular segment in response to certain segment load instructions executed by execution core 14. The segment selector identifies the segment descriptor in a segment descriptor table in memory. More particularly, processor 10 may employ two segment descriptor tables: a local descriptor table and a global descriptor table. The base address of the local descriptor table is stored in the LDTR 30. Similarly, the base address of the global descriptor table is stored in GDTR 32. A bit within the segment selector (the table indicator bit) selects the descriptor table, and the remainder of the segment selector is used as an index into the selected table. When an instruction loads a segment selector into one of segment registers 24, MMU 20 reads the corresponding segment descriptor from the selected segment descriptor table and stores information from the segment descriptor into the segment descriptor field (e.g. segment descriptor field 24AB for segment register 24A). The information stored in the segment descriptor field may comprise any suitable subset of the segment descriptor, including all of the segment descriptor, if desired. Additionally, other information derived from the segment descriptor or other sources may be stored in the segment descriptor field, if desired. For example, an embodiment may decode the operating mode indications from the code segment descriptor and store the decoded value rather than the original values of the operating mode indications. If an instruction causes CS to be loaded with a segment selector, the code segment may change and thus the operating mode of processor 10 may change.

In one embodiment, the CS segment register is used in 32/64 mode. The data segment registers are ignored. In 16 and 32 bit modes, the code segment and data segments may be active. Furthermore, a second enable indication (PE) in control register 28 may affect the operation of MMU 20. The PE enable indication may be used to enable protected mode, in which segmentation and/or paging address translation mechanisms may be used. If the PE enable indication is in the disabled state, segmentation and paging mechanisms are disabled and processor 10 is in "real mode" (in which addresses generated by execution core 14 are physical addresses). Similar to the LME indication, the PE indication may be a bit in which the enabled state is the bit being set and the disabled state is the bit being clear. However, other embodiments are contemplated as described above.

It is noted that MMU 20 may employ additional hardware mechanisms, as desired. For example, MMU 20 may include paging hardware to implement paging address translation from virtual addresses to physical addresses. The paging hardware may include a translation lookaside buffer (TLB) to store page translations.

It is noted that control registers 26 and 28 may be implemented as architected control registers (e.g. control register 26 may be CR4 and control register 28 may be CR0). Alternatively, one or both of the control registers may be implemented as model specific registers to allow for other uses of the architected control registers without interfering with 32/64 mode.

Generally, instruction cache 12 is a high speed cache memory for storing instruction bytes. Execution core 14 fetches instructions from instruction cache 12 for execution. Instruction cache 12 may employ any suitable cache organization, including direct-mapped, set associative, and fully associative configurations. If an instruction fetch misses in instruction cache 12, instruction cache 12 may communicate with external interface unit 18 to fill the missing cache line into instruction cache 12. Additionally, instruction cache 12 may communicate with MMU 20 to receive physical address translations for virtual addresses fetched from instruction cache 12.

Execution core 14 executes the instructions fetched from instruction cache 12. Execution core 14 fetches register operands from register file 22 and updates destination registers in register file 22. The size of the register operands is controlled by the operating mode and any overrides of the operating mode for a particular instruction. Similarly, execution core 14 fetches memory operands from data cache 16 and updates destination memory locations in data cache 16, subject to the cacheability of the memory operands and hitting in data cache 16. The size of the memory operands is similarly controlled by the operating mode and any overrides of the operating mode for a particular instruction. Furthermore, the size of the addresses of the memory operands generated by execution core 14 is controlled by the operating mode and any overrides of the operating mode for a particular instruction.

Execution core 14 may employ any suitable construction. For example, execution core 14 may be a superpipelined core, a superscalar core, or a combination thereof Execution core 14 may employ out of order speculative execution or in order execution, according to design choice.

Register file 22 may include 64 bit registers which may be accessed as 64 bit, 32 bit, 16 bit, or 8 bit registers as indicated by the operating mode of processor 10 and any overrides for a particular instruction. The register format for one embodiment is described below with respect to FIG. 7. The registers included in register file 22 may include the LEAX, LEBX, LECX, LEDX, LEDI, LESI, LESP, and LEBP registers. Register file 22 may further include the LEIP register. Alternatively, execution core 14 may employ a form of register renaming in which any register within register file 22 may be mapped to an architected register. The number of registers in register file 22 may be implementation dependent for such an embodiment.

Data cache 16 is a high speed cache memory configured to store data. Data cache 16 may employ any suitable cache organization, including direct-mapped, set associative, and fully associative configurations. If a data fetch or update misses in data cache 16, data cache 16 may communicate with external interface unit 18 to fill the missing cache line into data cache 16. Additionally, if data cache 16 employs a writeback caching policy, updated cache lines which are being cast out of data cache 16 may be communicated to external interface unit 18 to be written back to memory. Data cache 16 may communicate with MMU 20 to receive physical address translations for virtual addresses presented to data cache 16.

External interface unit 18 communicates with portions of the system external to processor 10. External interface unit 18 may communicate cache lines for instruction cache 12 and data cache 16 as described above, and may communicate with MMU 20 as well. For example, external interface unit 18 may access the segment descriptor tables and/or paging tables on behalf of MMU 20.

It is noted that processor 10 may include an integrated level 2 (L2) cache, if desired. Furthermore, external interface unit 18 may be configured to communicate with a backside cache in addition to communicating with the system.

Figure 2:
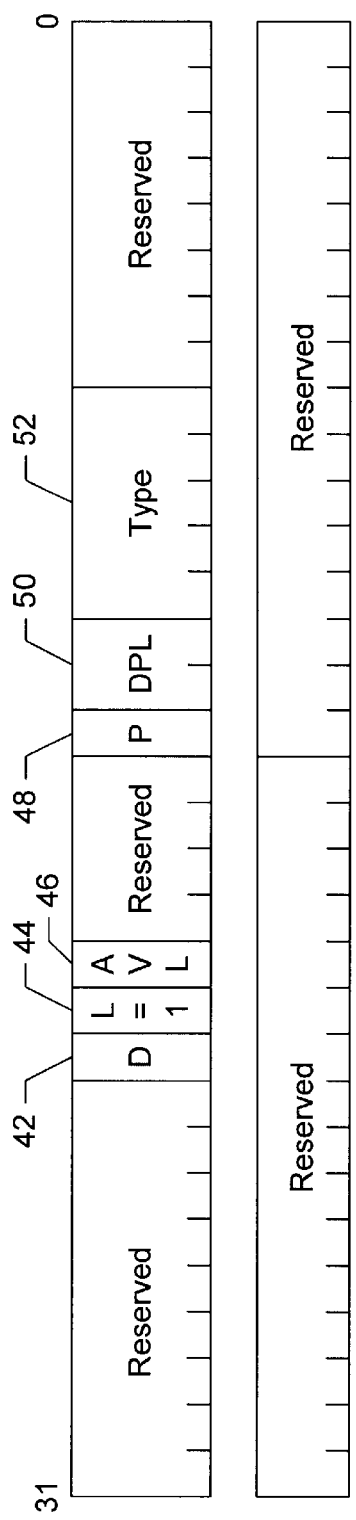
FIG. 2 is a block diagram of one embodiment of a segment descriptor for 32/64 mode.

Turning now to FIG. 2, a block diagram of one embodiment of a code segment descriptor 40 for 32/64 mode is shown. Other embodiments are possible and contemplated. In the embodiment of FIG. 2, code segment descriptor 40 comprises 8 bytes with the most significant 4 bytes illustrated above the least significant 4 bytes. The most significant four bytes are stored at a numerically larger address than the least significant four bytes. The most significant bit of each group of four bytes is illustrated as bit 31 in FIG. 2 (and FIG. 3 below), and the least significant bit is illustrated as bit 0. Short vertical lines within the four bytes delimit each bit, and the long vertical lines delimit a bit but also delimit a field (both in FIG. 2 and in FIG. 3).

Unlike the 32 bit and 16 bit code segment descriptors illustrated in FIG. 3 below, code segment descriptor 40 does not include a base address or limit. Processor 10 employs a flat virtual address space for 32/64 mode (rather than the segmented linear address space employed in 32 bit and 16 bit modes). Accordingly, the portions of code segment descriptor 40 which would otherwise store the base address and limit are reserved in segment descriptor 40. It is noted that a virtual address provided through segmentation may also be referred to herein as a "linear address". The term "virtual address" encompasses any address which is translated through a translation mechanism to a physical address actually used to address memory, including linear addresses and other virtual addresses generated in non-segmented architectures.

Figures 5, 6:
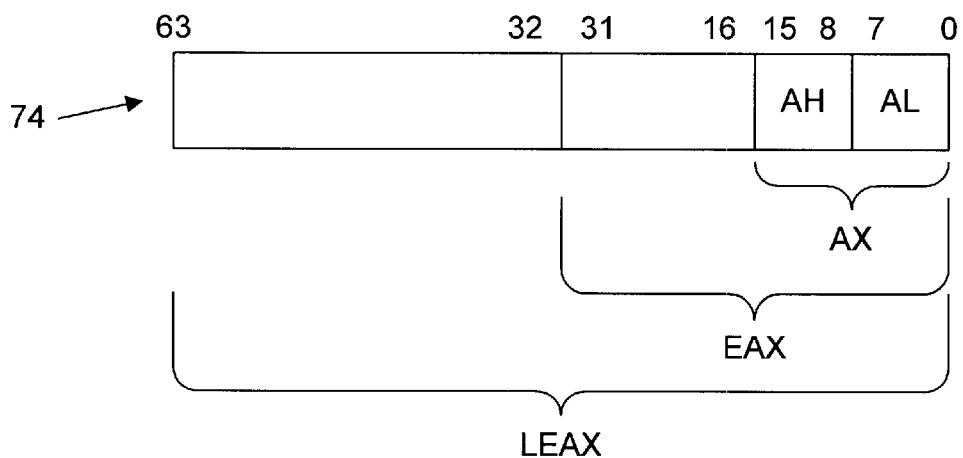
FIG. 5 is a table illustrating one embodiment of operating modes as a function of segment descriptor and control register values.
FIG. 6 is a block diagram of one embodiment of a register.

Segment descriptor 40 includes a D bit 42, an L bit 44 (set to one for a 32/64 mode code segment), an available bit (AVL) 46, a present (P) bit 48, a descriptor privilege level (DPL) 50, and a type field 52. D bit 42 and L bit 44 are used to determine the operating mode of processor 10, as illustrated in FIG. 5 below. AVL bit 46 is available for use by system software (e.g. the operating system). P bit 48 is used to indicate whether or not the segment is present in memory. If P bit 48 is set, the segment is present and code may be fetched from the segment. If P bit 48 is clear, the segment is not present and an exception is generated to load the segment into memory (e.g. from disk storage or through a network connection). The DPL indicates the privilege level of the segment. Processor 10 employs four privilege levels (encoded as 0 through 3 in the DPL field, with level 0 being the most privileged level). Certain instructions and processor resources (e.g. configuration and control registers) are only executable or accessible at the more privileged levels, and attempts to execute these instructions or access these resources at the lower privilege levels result in an exception. When information from code segment 40 is loaded into the CS segment register, the DPL becomes the current privilege level (CPL) of processor 10. Type field 52 encodes the type of segment. For code segments, the most significant bit two bits of type field 52 may be set (the most significant bit distinguishing a code or data segment from a system segment, and the second most significant bit distinguishing a code segment from a data segment), and the remaining bits may encode additional segment type information (e.g. execute only, execute and read, or execute and read only, conforming, and whether or not the code segment has been accessed).

It is noted that, while several indications in the code segment descriptor are described as bits, with set and clear values having defined meanings, other embodiments may employ the opposite encodings and may use multiple bits, as desired. Thus, for example, the D bit 42 and the L bit 44 may each be an example of an operating mode indication which may be one or more bits as desired, similar to the discussion of enable indications above.

Figure 3:
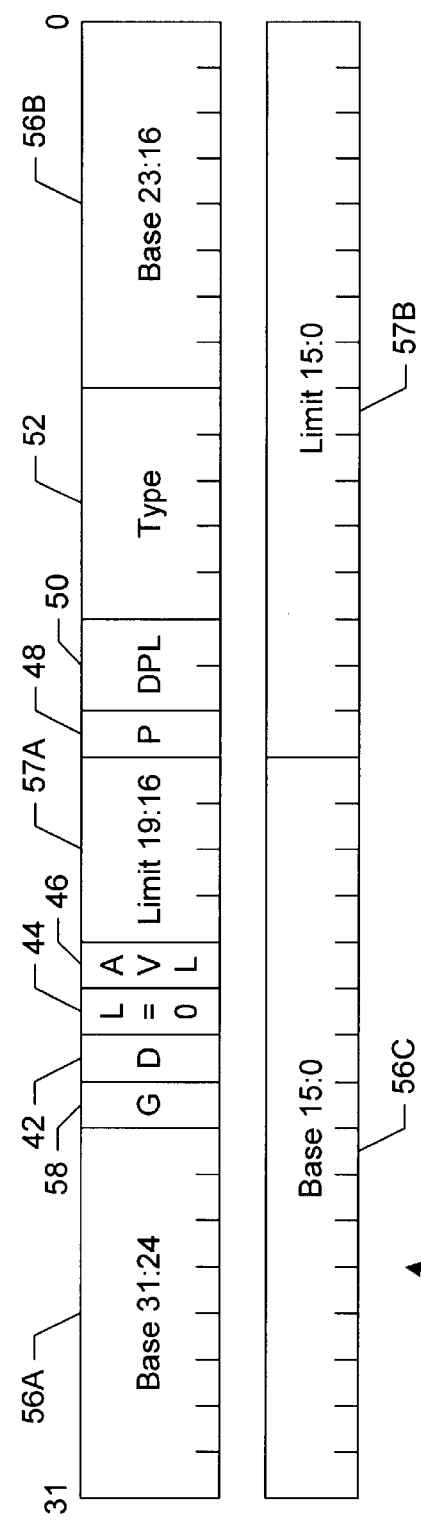
FIG. 3 is a block diagram of one embodiment of a segment descriptor for compatibility mode.

Turning now to FIG. 3, a block diagram of one embodiment of a code segment descriptor 54 for 32 and 16 bit compatibility mode is shown. Other embodiments are possible and contemplated. As with the embodiment of FIG. 2, code segment descriptor 54 comprises 8 bytes with the most significant 4 bytes illustrated above the least significant 4 bytes.

Code segment descriptor 54 includes D bit 42, L bit 44, AVL bit 46, P bit 48, DPL 50, and type field 52 similar to the above description of code segment descriptor 40. Additionally, code segment descriptor 54 includes a base address field (reference numerals 56A, 56B, and 56C), a limit field (reference numerals 57A and 57B) and a G bit 58. The base address field stores a base address which is added to the logical fetch address (stored in the LEIP register) to form the linear address of an instruction, which may then optionally be translated to a physical address through a paging translation mechanism. The limit field stores a segment limit which defines the size of the segment. Attempts to access a byte at a logical address greater than the segment limit are disallowed and cause an exception. G bit 58 determines the scaling of the segment limit field. If G bit 58 is set the limit is scaled to 4K byte pages (e.g. 12 least significant zeros are appended to the limit in the limit field). If G bit 58 is clear, the limit is used as is.

It is noted that code segment descriptors for 32 and 16 bit modes when 32/64 mode is not enabled via the LME bit in control register 26 may be similar to code segment descriptor 54, except the L bit is reserved and defined to be zero. It is further noted that, in 32 and 16 bit modes (both compatibility mode with the LME bit set and modes with the LME bit clear) according to one embodiment, data segments are used as well. Data segment descriptors may be similar to code segment descriptor 54, except that the D bit 42 is defined to indicate the upper bound of the segment or to define the default stack size (for stack segments).

Figure 4:
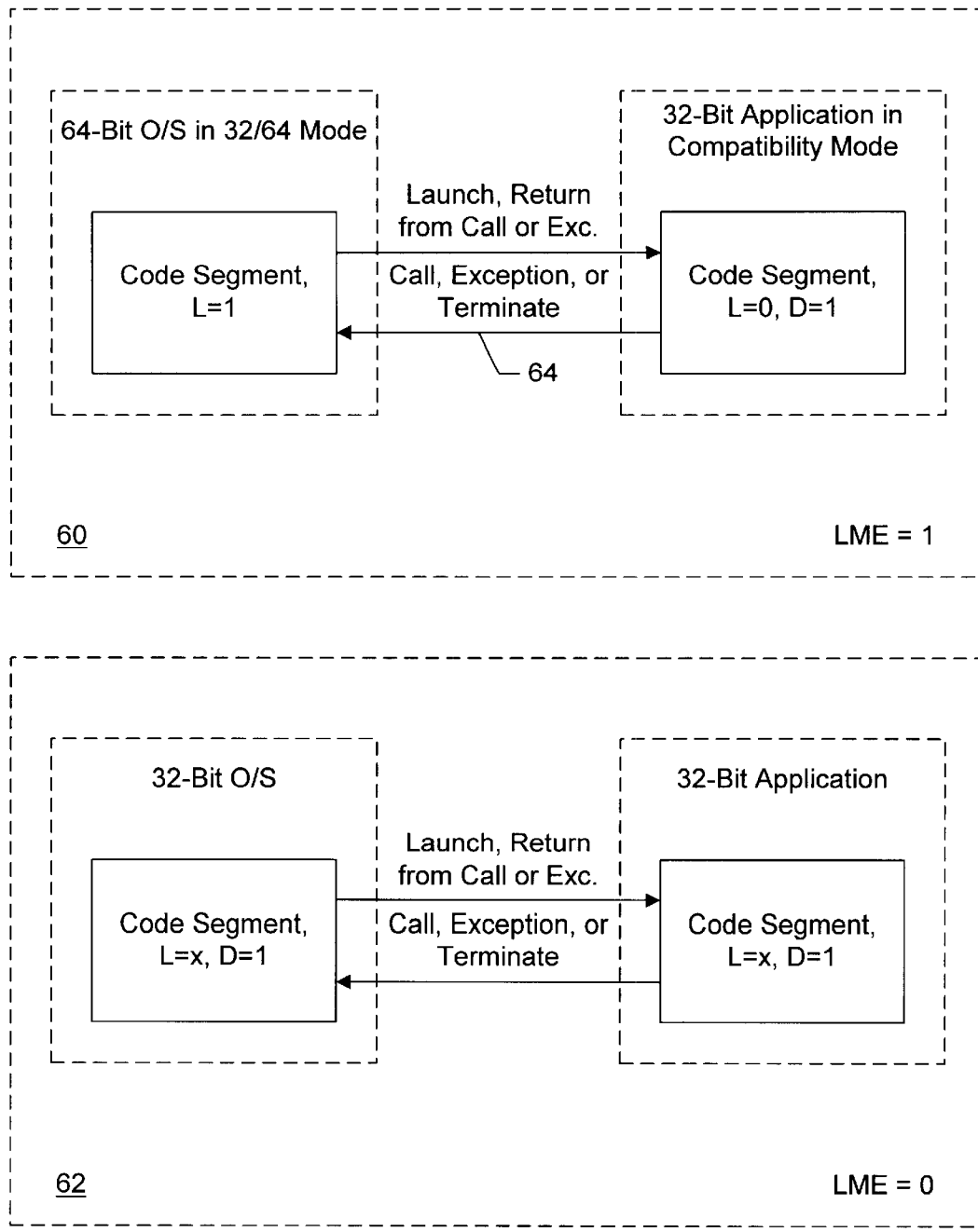
FIG. 4 is a block diagram of operation in compatibility mode and in legacy mode according to one embodiment of the processor shown in FIG. 1.

Turning next to FIG. 4, a diagram illustrating exemplary uses of the LME bit in control register 26 and the compatibility modes to allow for a high degree of flexibility in implementing the 32/64 mode and the 32 and 16 bit modes is shown. A box 60 illustrates exemplary operation when the LME bit is set, and a box 62 illustrates exemplary operation when the LME bit is clear.

As illustrated in box 60, the compatibility modes supported when the LME bit is set may allow for a 64 bit operating system (i.e. an operating system designed to take advantage of the virtual and physical address spaces in excess of 32 bits and/or data operands of 64 bits) to operate with a 32 bit application program (i.e. an application program written using 32 bit operand and address sizes). The code segment for the operating system may be defined by the 32/64 mode code segment descriptor 40 illustrated in FIG. 2, and thus the L bit may be set. Accordingly, the operating system may take advantage of the expanded virtual address space and physical address space for the operating system code and the data structures maintained by the operating system (including, e.g. the segment descriptor tables and the paging translation tables). The operating system may also use the 64 bit data type defined in 32/64 mode using instruction encodings which override the default 32 bit operand size. Furthermore, the operating system may launch a 32 bit application program by establishing one or more 32 bit compatibility mode segment descriptors (L bit cleared, D bit set, e.g. segment descriptor 54 shown in FIG. 2) in the segment descriptor table and branching into one of the compatibility mode segments. Similarly, the operating system may launch a 16 bit application program by establishing one or more 16 bit compatibility mode segment descriptors (L bit cleared, D bit cleared, e.g. segment descriptor 54 shown in FIG. 2) in the segment descriptor table and branching into one of the compatibility mode segments. Accordingly, a 64 bit operating system may retain the ability to execute existing 32 bit and 16 bit application programs in the compatibility mode. A particular application program may be ported to 32/64 mode if the expanded capabilities are desired for that program, or may remain 32 bit or 16 bit.

While processor 10 is executing the 32 bit application program, the operating mode of processor 10 is 32 bit. Thus, the application program may generally execute in the same fashion as it does in 32 bit mode with the LME bit clear (e.g. when the operating system is a 32 bit operating system as well). However, the application program may call an operating system service, experience an exception, or terminate. In each of these cases, processor 10 may return to executing operating system code (as illustrated by arrow 64 in FIG. 4). Since the operating system code operates in 32/64 mode, the address of the operating system service routine, exception handler, etc. may exceed 32 bits. Thus, processor 10 may need to generate an address greater than 32 bits prior to returning to the operating system code. The LME bit provides processor 10 with an indication that the operating system may be operating in 32/64 mode even though the current operating mode is 32 bit, and thus processor 10 may provide the larger address space for operating system calls and exceptions.

In one embodiment, exceptions are handled using interrupt segment descriptors stored in an interrupt segment descriptor table. If the LME bit is set, the interrupt segment descriptors may be 16 byte entries which include a 64 bit address of the operating system routine which handles the exception. If the LME bit is clear, the interrupt segment descriptors may be eight byte entries which include a 32 bit address. Accordingly, processor 10 accesses the interrupt descriptor table responsive to the LME indication (i.e. reading a 16 byte entry if the LME bit is set and reading an eight byte entry if the LME bit is clear). Therefore, exceptions may be handled by the 64 bit operating system even though the application program is executing in 32 bit compatibility mode. Furthermore, processor 10 supports a 32 bit (or 16 bit) operating system if the LME bit is clear.

Similarly, the call mechanisms within processor 10 may operate in different fashions based on the state of the LME bit. Since the operating system typically executes at a higher privilege level than the application program, transfers from the application program to the operating system are carefully controlled to ensure that the application program is only able to execute permitted operating system routines. More generally, changes in privilege level are carefully controlled. In one embodiment, processor 10 may support at least two mechanisms for performing operating system calls. One method may be through a call gate in the segment descriptor tables (described in more detail below). Another method may be the SYSCALL instruction supported by processor 10, which uses a model specific register as the source of the address of the operating system routine. Updating the model specific registers is a privileged operation, and thus only code executing at a higher privilege level (e.g. operating system code) may establish the address in the model specific register used by the SYSCALL instruction. For the SYSCALL method, a second model specific register may be defined to store the most significant 32 bits of the address of the operating system routine. Thus, if the LME bit is set, the address may be read from the two model specific registers. If the LME bit is clear, the address may be read from the model specific register storing the least significant 32 bits. Alternatively, the model specific register used by the SYSCALL instruction may be expanded to 64 bits and the address may be 32 bits (the least significant 32 bits of the model specific register) or 64 bits based on the state of the LME bit.

As illustrated above, having the LME bit set may allow for processor 10 to operate in a system in which the operating system is 64 bit and one or more application programs are not 64 bit (e.g. 32 bit as shown or 16 bit, which operates in a similar fashion to the above description). Additionally, as illustrated by box 62, having the LME bit clear may allow for processor 10 to operate in 32 bit or 16 bit modes compatible with the x86 architecture. As described above, the mechanisms for handling exceptions and operating system calls are designed to handle the LME bit being set or clear, and thus the 32 bit and 16 bit modes may operate unmodified, even though processor 10 is capable of operating in 32/64 mode. Furthermore, by providing the x86 compatible 16 and 32 bit modes when the LME bit is clear, (and ignoring the L bit, which is reserved in these modes) processor 10 may operate in a system in which the L bit is defined for some other purpose than for 32/64 mode and may still support 32/64 mode if the LME bit is set. Accordingly, a system employing a 32 bit operating system and 32 bit or 16 bit application programs may employ processor 10. Subsequently, the system could be upgraded to a 64 bit operating system without having to change processor 10.

Not illustrated in FIG. 4 is a 64 bit operating system and a 64 bit application program operating with the LME bit set. The mechanisms for calling operating system routines described above for the 64 bit operating system and 32 bit application program may apply equally to the 64 bit application program as well. Additionally, call gates which support 64 bits of offset are supported (as will be described in more detail below).

Turning next to FIG. 5, a table 70 is shown illustrating the states of the LME bit, the L bit in the code segment descriptor, and the D bit in the code segment descriptor and the corresponding operating mode of processor 10 according to one embodiment of processor 10. Other embodiments are possible and contemplated. As table 70 illustrates, if the LME bit is clear, then the L bit is reserved (and defined to be zero). However, processor 10 may treat the L bit as a don't care if the LME bit is clear. Thus, the x86 compatible 16 bit and 32 bit modes may be provided by processor 10 if the LME bit is clear. If the LME bit is set and the L bit in the code segment is clear, then a compatibility operating mode is established by processor 10 and the D bit selects 16 bit or 32 bit mode. If the LME bit and the L bit are set and the D bit is clear, 32/64 mode is selected for processor 10. Finally, the mode which would be selected if the LME, L and D bits are all set is reserved.

As mentioned above, the 32/64 operating mode includes a default address size in excess of 32 bits (implementation dependent but up to 64 bits) and a default operand size of 32 bits. The default operand size of 32 bits may be overridden to 64 bits via a particular instruction's encoding. The default operand size of 32 bits is selected to minimize average instruction length (since overriding to 64 bits involves including an instruction prefix in the instruction encoding which may increase the instruction length) for programs in which 32 bits are sufficient for many of the data manipulations performed by the program. For such programs (which may be a substantial number of the programs currently in existence), moving to a 64 bit operand size may actually reduce the execution performance achieved by the program (i.e. increased execution time). In part, this reduction may be attributable to the doubling in size in memory of the data structures used by the program when 64 bit values are stored. If 32 bits is sufficient, these data structures would store 32 bit values, Thus, the number of bytes accessed when the data structure is accessed increases if 64 bit values are used where 32 bit values would be sufficient, and the increased memory bandwidth (and increased cache space occupied by each value) may cause increased execution time. Accordingly, 32 bits is selected as the default operand size and the default may be overridden via the encoding of a particular instruction.

Turning now to FIG. 6, a diagram illustrating one embodiment of the LEAX register 74 is shown. Other registers within register file 22 may be similar. Other embodiments are possible and contemplated. In the embodiment of FIG. 6, register 74 includes 64 bits, with the most significant bit labeled as bit 63 and the least significant bit labeled as bit 0. FIG. 6 illustrates the portions of the LEAX register accessed based upon the operand size of an instruction (if the A register is selected as an operand). More particularly, the entirety of register 74 is accessed if the operand size is 64 bits (as illustrated by the brace labeled "LEAX" in FIG. 6). If the operand size is 32 bits, bits 31:0 of register 74 are accessed (as illustrated by the brace labeled "EAX" in FIG. 6). If the operand size is 16 bits, bits 16:0 of the register are accessed (as illustrated by the brace labeled "AX" in FIG. 6). The above operand sizes may be selected based on the operating mode and the inclusion of any override prefixes. However, certain instruction opcodes are defined which access an eight bit register (AH or AL in FIG. 6).

Figure 7:
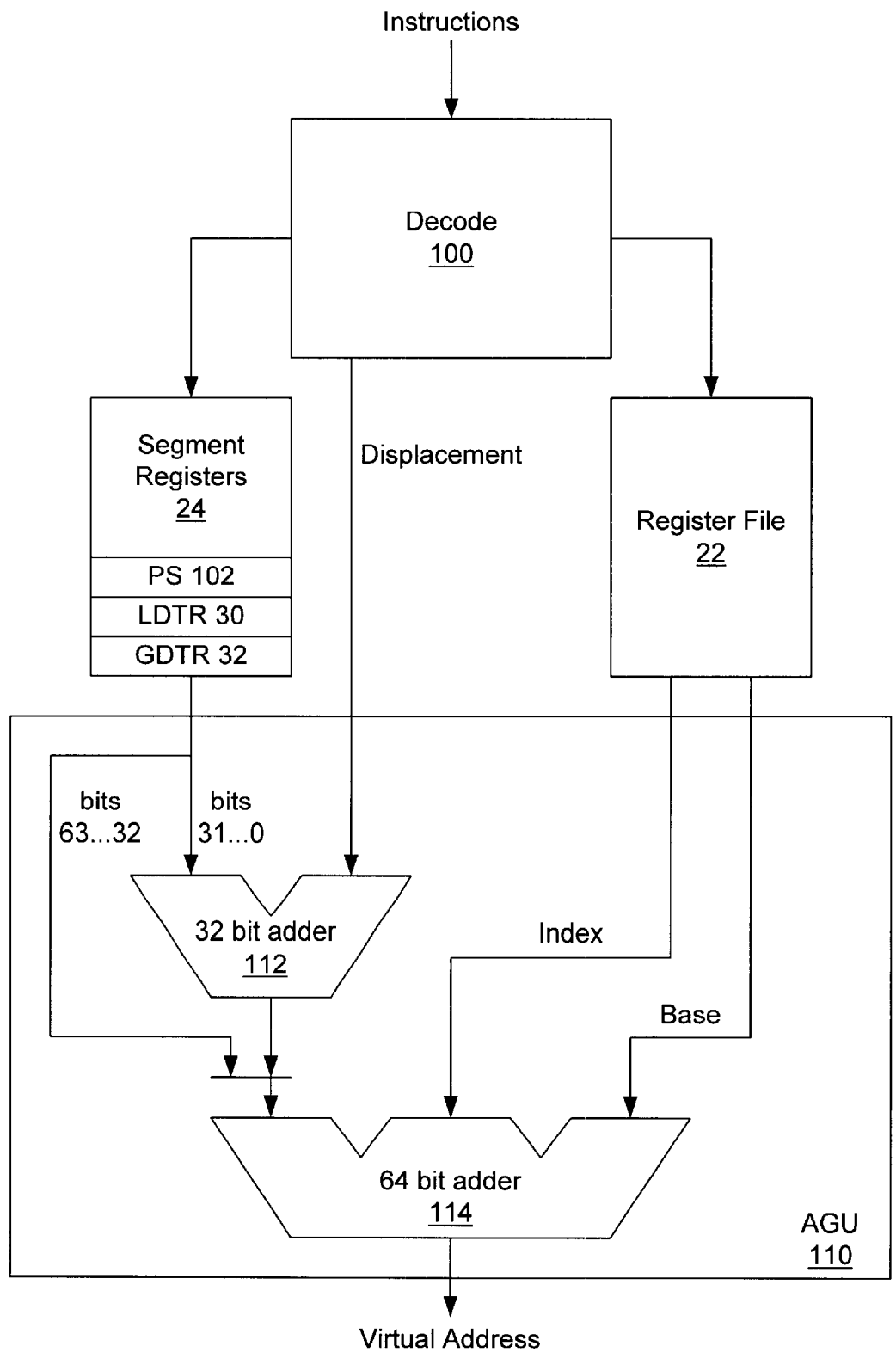
FIG. 7 is a block diagram of one embodiment of a processor including an address generation unit.

Turning next to FIG. 7, a block diagram of one embodiment of a processor including an address generation unit is shown. Other embodiments are possible and contemplated. FIG. 7 depicts decode unit 100, register file 22, segment registers 24, pseudo-segment register 102, LDTR 30, GDTR 32, and address generation unit (AGU) 110. AGU 110 includes 32 bit adder 112 and 64 bit adder 114. Interconnections among the elements of FIG. 7 are shown, although other interconnections are possible and contemplated.

AGU 110 can be configured to generate 64 bit addresses using adder 112 and adder 114. In one embodiment, AGU 110 can generate 64 bit addresses when operating in 32/64 mode as described above and can generate other address sizes when operating in other modes. An instruction received by decode unit 100 can indicate the values to be used by AGU 110 to generate an address. These values can include an index value and a base value that can be specified by the instructions using register operands. The register operand or operands can be conveyed to register file 22, and register file 22 can convey values corresponding to the operands to AGU 110. The instruction can also specify a displacement value. The displacement value can be conveyed to AGU 110 as shown. In generating an address, an address value from segment registers 24, pseudo-segment register 102, LDTR 30 or GDTR 32 may be used. Segment registers 24, pseudo-segment register 102, LDTR 30 or GDTR 32 can provide the address value to AGU 110 as indicated.

In one embodiment, segmentation is disabled in 32/64 mode. Thus, in 32/64 mode, a flat address space model is used and the base address of a segment register 24 is not used to generate a virtual address. When the processor is operating in 32/64 mode, the base address of pseudo-segment register 102 can be used to generate the virtual address. In one embodiment, pseudo-segment register 102 is a non-architected register such that the register is not selectable via an instruction encoding. In addition, the base address of pseudo-segment register 102 can be set to zero such that this zero value can be used by AGU 110 to generate the virtual address. In this manner, additional hardware may not be needed in AGU 110 to generate virtual addresses in 32/64 mode even though segment base addresses from the architected segment registers are not used.

In 32/64 mode, AGU 110 can generate 64 bit virtual addresses. In one embodiment, adder 112 can add the least significant 32 bits of the base address from pseudo-segment register 102 to a displacement value to generate an intermediate result. Adder 114 can then add a concatenation of the intermediate result and the most significant 32 bits of the base address from pseudo-segment register 102 to a base value and an index value to generate a 64 bit virtual address. In one embodiment, the base value and the index value can be up to 64 bits in 32/64 mode. The base value or index value may also be 32, 16 or 8 bits. Adder 114 may generate the virtual address in a clock cycle immediately following the clock cycle that adder 112 generated the intermediate result.

When the processor is not operating in 32/64 mode, the processor can operate in a segmentation mode. Thus, the base address of a segment register 24 can be used for a virtual address generation. In one embodiment, this base address can be 32 or fewer bits. Adder 112 can add this base address to a displacement to generate an intermediate result. Adder 114 can then add the intermediate result to a base value and an index value. In one embodiment, the base value and the index value can be either 32, 16 or 8 bits when the processor is not operating in 32/64 mode. Adder 114 may generate the virtual address in a clock cycle immediately following the clock cycle that adder 112 generated the intermediate result.

As noted above, LDTR 30 and GDTR 32 can include addresses that indicate the base addresses of the local segment descriptor table and the global segment descriptor table, respectively. In one embodiment, these addresses can be 64 bit addresses if the LME bit is set so that the tables can be located anywhere in a memory space that is addressed using 64 bits. An address stored in either LDTR 30 or GDTR 32 can be referred to generally as a segment descriptor table address. In order to access a descriptor located in one of these tables, AGU 110 can generate a virtual address using the segment descriptor table address, a displacement value, an index value, and a base value.

AGU 110 can generate a virtual address using adder 112 and adder 114. AGU 110 can receive a segment descriptor table address from LDTR 30 or GDTR 32 as well as a displacement value from decode 100, an index value and a base value from register file 22. Adder 112 can add the displacement value to a first portion of the segment descriptor table address to generate an intermediate result. In one embodiment, the first portion of the segment descriptor address can comprise the least significant 32 bits of the address. The intermediate result can then be concatenated with a second portion of the segment descriptor table address. In one embodiment, the second portion of the segment descriptor address can comprise the most significant 32 bits of the address. The concatenated result can be conveyed to adder 114. Adder 114 can then add the concatenated result to the base value and the index value to generate a virtual address.

To insure that adder 112 does not generate a carry bit, the segment descriptor table address is required to be aligned on an address boundary and the displacement value is required not to exceed a maximum value. The address boundary can be an integer multiple of a fixed number of bytes.

In one embodiment, segment descriptor table addresses are required to be aligned on 16 byte boundaries, and the maximum value for displacement values is sixteen. This embodiment is illustrated in FIG. 8a, FIGS. 8b, and 8c.

Figure 8A:
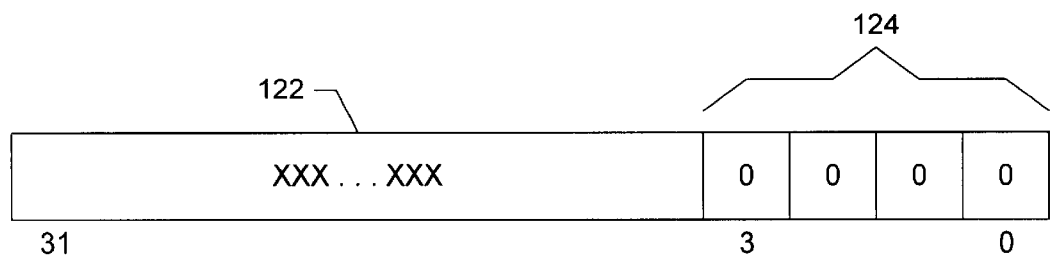
FIG. 8a is a block diagram of one embodiment of a portion of a segment descriptor table address.

FIG. 8a depicts a portion of a segment descriptor table address 120. By requiring segment descriptor table addresses to be aligned on 16 byte boundaries, the four least significant bits 124 of a segment descriptor table address will be zero. The remaining bits 122 of segment descriptor table address 120 can specify the base address of a corresponding descriptor table. It can be noted that another portion of segment descriptor table address 120, not shown, can contain the most significant bits of the base address, such as bits 32 through 63.

Figure 8B:
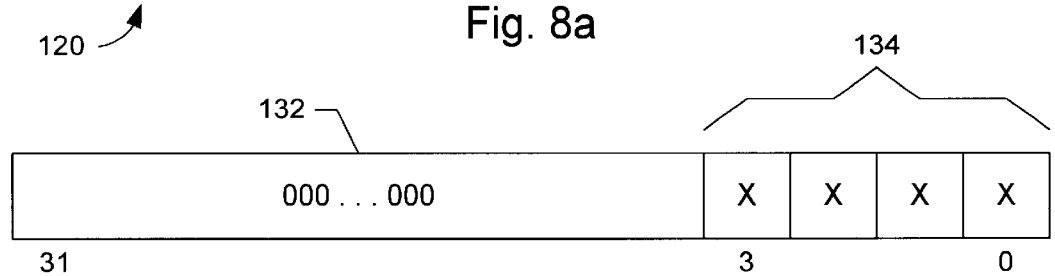
FIG. 8b is a block diagram of one embodiment of a displacement value.
Figure 8C:
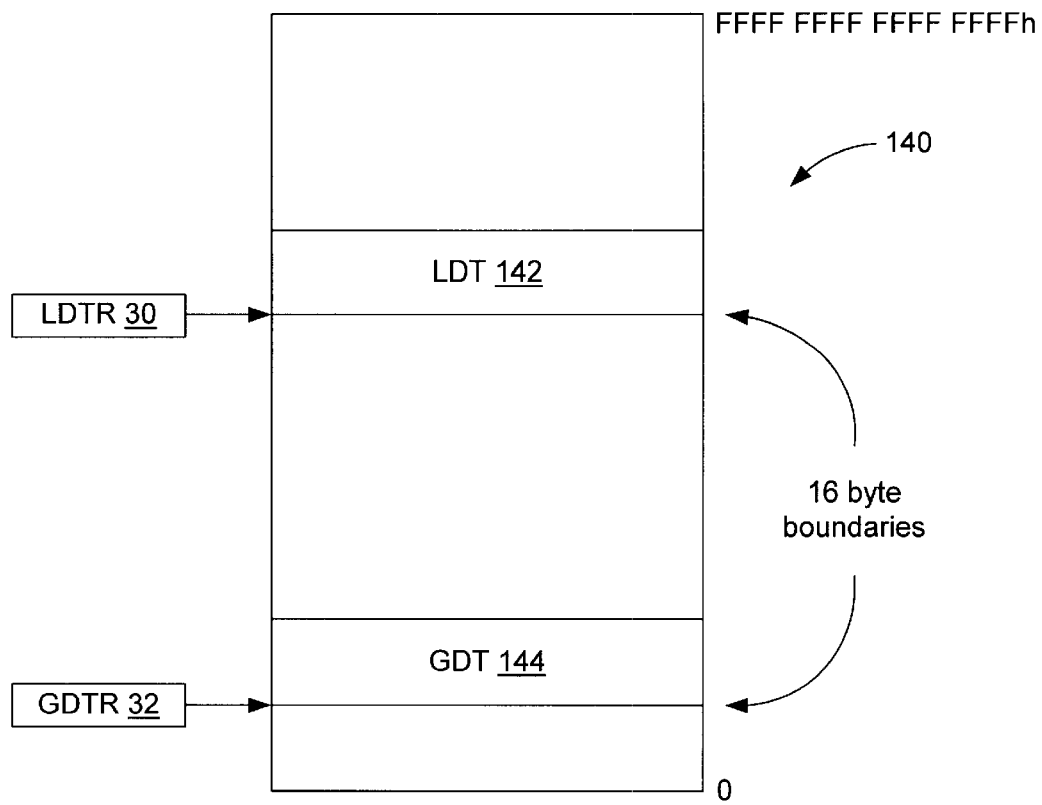
FIG. 8c is a block diagram of one embodiment of descriptor tables in a memory.

FIG. 8b depicts displacement value 130. By limiting the displacement value to a maximum value of sixteen, the displacement value can be represented by the four least significant bits 134 of displacement value 130. Accordingly, the bits of the displacement value above the fourth bit, collectively bits 132, will be zero.

When adder 112 adds a displacement value 120 and a portion of a segment descriptor table address 130, the zeros in the four least significant bits 124 ensure that a carry will not be generated in bits 3 through 0 and the zeros in bits 132 of the displacement value ensure that a carry will not be generated in bits 31 through 4. Accordingly, the intermediate result generated by adding a displacement value 120 and a portion of a segment descriptor table address 130 can be concatenated with the remaining portion of the segment descriptor table address to create a 64 bit value. This 64 bit value can be added to an index value and a base value in adder 114 as indicated above to generate a 64 bit virtual address.

FIG. 8c depicts LDT 142 and GDT 144 as aligned on 16 byte boundaries in a 64 bit address space 140 (indicated by addresses 0 through FFFF FFFF FFFF FFFFh). Accordingly, the segment descriptor table addresses of LDTR 30 and GDTR 32 point to the base of LDT 142 and GDT 144, respectively. In this manner, LDT 142 and GDT 144 can be located anywhere in address space 140 as long as they begin on a 16 byte boundary.

In the embodiment of FIG. 7, a fault can be generated if the segment descriptor table address is not properly aligned on an address boundary. In one embodiment, the fault can be generated by the processor itself, either in hardware or in software such as microcode. In another embodiment, the fault can be generated by an operating system running on the processor.

In one embodiment, the process of generating an address into a segment descriptor table can be handled by microcode or hardware to ensure that the displacement value does not exceed a maximum value.

In one embodiment, adder 112 can be configured to generate the intermediate result in a first clock cycle and adder 114 may be configured to generate the virtual address in a second clock cycle that immediately follows the first clock cycle. In this manner, the apparatus and method described herein may advantageously permit 64 bit addresses to be generated while minimizing the hardware needed to do so and permitting increased clock speeds in a processor. More specifically, adder 112 can comprise a 32 bit adder as opposed to a 64 bit adder and the generation of virtual addresses can be spread over two clock cycles to allow clock speeds to be increased.

It can be noted that FIG. 7 depicts a simplified portion of processor 10. The processor may also include other pipeline stages between decode unit 100 and AGU 110 such as a reservation station or a scheduler.

Figure 9:
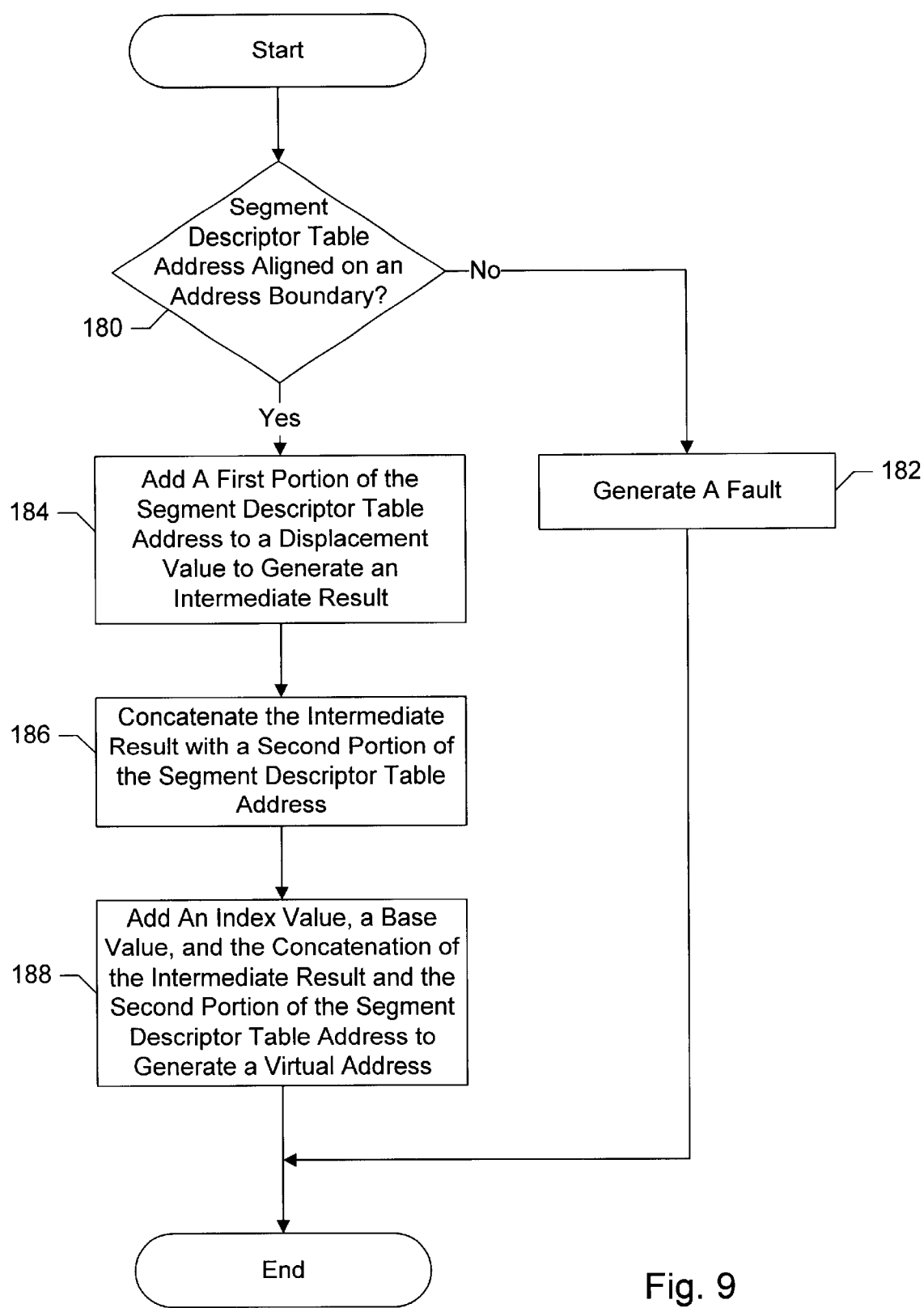
FIG. 9 is a flow chart illustrating a method of generating 64 bit addresses.

Turning next to FIG. 9, a flow chart illustrating a method of generating 64 bit addresses is shown. Variations on the method are possible and contemplated. In FIG. 9, a determination is made as to whether a segment descriptor table address is aligned on an address boundary as indicated in block 180. In one embodiment, this determination can be made in response to a segment descriptor table address being changed. If the segment descriptor table address is not aligned on the address boundary, then a fault is generated as indicated by block 182.

If the segment descriptor table address is aligned on the address boundary, then a first portion of the segment descriptor table address is added to a displacement value to generate an intermediate result as indicated in block 184. The intermediate result is concatenated with a second portion of the segment descriptor table address as indicated in block 186. An index value, a base value, and the concatenation of the intermediate result and the second portion of the segment descriptor table address are added to generate a virtual address as indicated in block 188.

Figure 10:
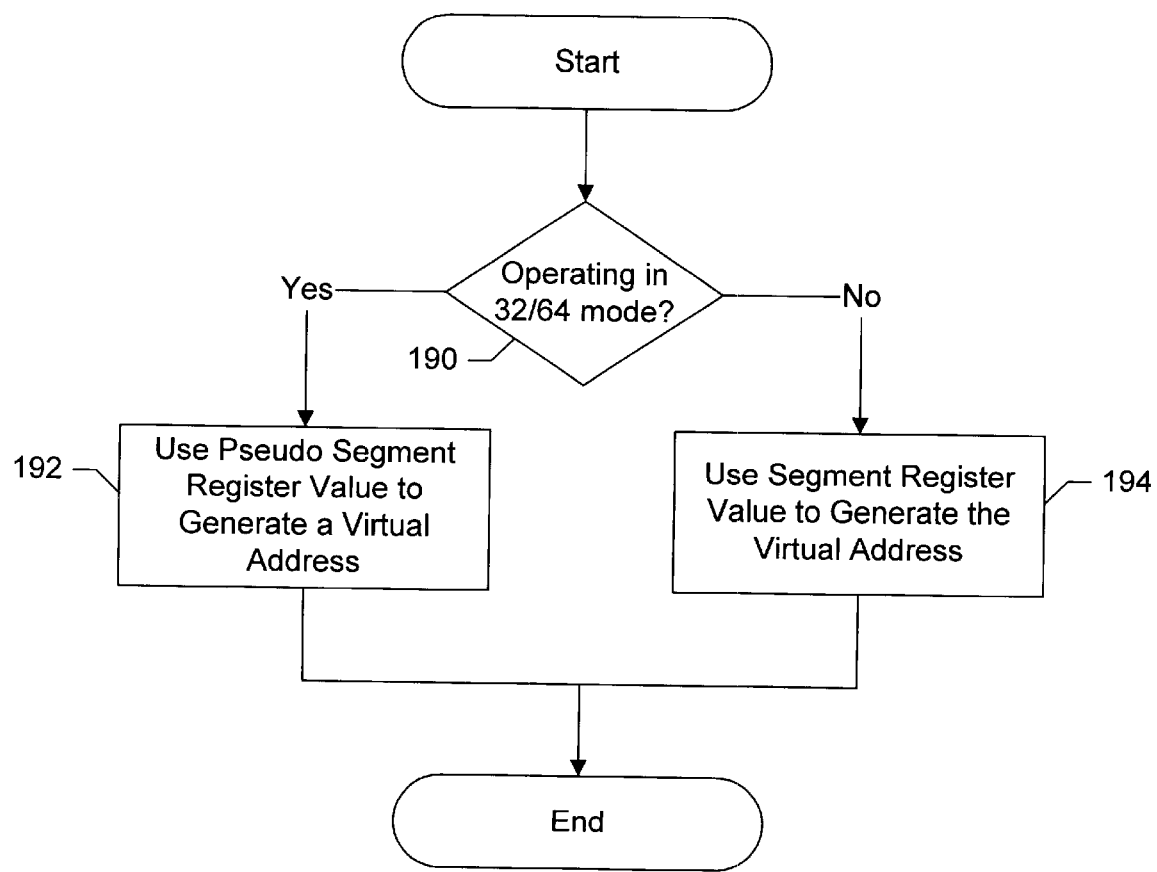
FIG. 10 is a flow chart illustrating a method of generating addresses in a 32/64 mode.

Turning next to FIG. 10, a flow chart illustrating a method of generating addresses in a 32/64 mode is shown. Variations on the method are possible and contemplated. In FIG. 10, a determination is made as to whether a processor is operating in a 32/64 mode as indicated in block 190. If the processor is operating in a 32/64 mode, then a pseudo-segment register value can be used to generate a virtual address as indicated in block 192. If the processor is not operating in a 32/64 mode, then a segment register value can be used to generate the virtual address as indicated in block 194.

Computer Systems

Figure 11:
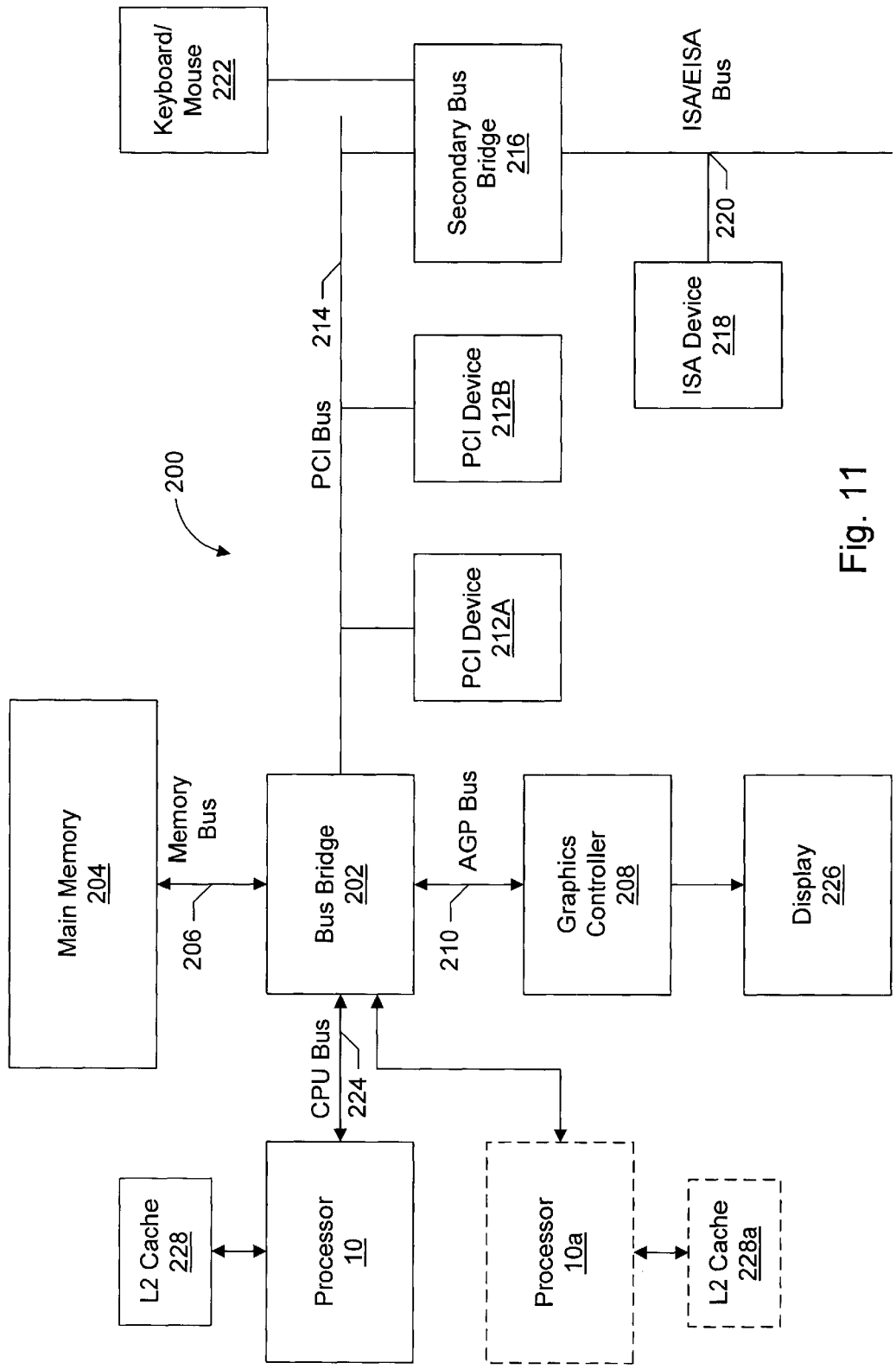
FIG. 11 is a block diagram of one embodiment of a computer system including the processor shown in FIG. 1.

Turning now to FIG. 11, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through a CPU bus 224 and to an optional L2 cache 228. Together, CPU bus 224 and the interface to L2 cache 228 may comprise an external interface to which external interface unit 18 may couple.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is further shown in a backside configuration to processor 10. It is noted that L2 cache 228 may be separate from processor 10, integrated into a cartridge (e.g. slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM) or Rambus DRAM (RDRAM) may be suitable.

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may be connected to bus bridge 202 via an independent bus (as shown in FIG. 11) or may share CPU bus 224 with processor 10. Furthermore, processor 10a may be coupled to an optional L2 cache 228a similar to L2 cache 228.

Figure 12:
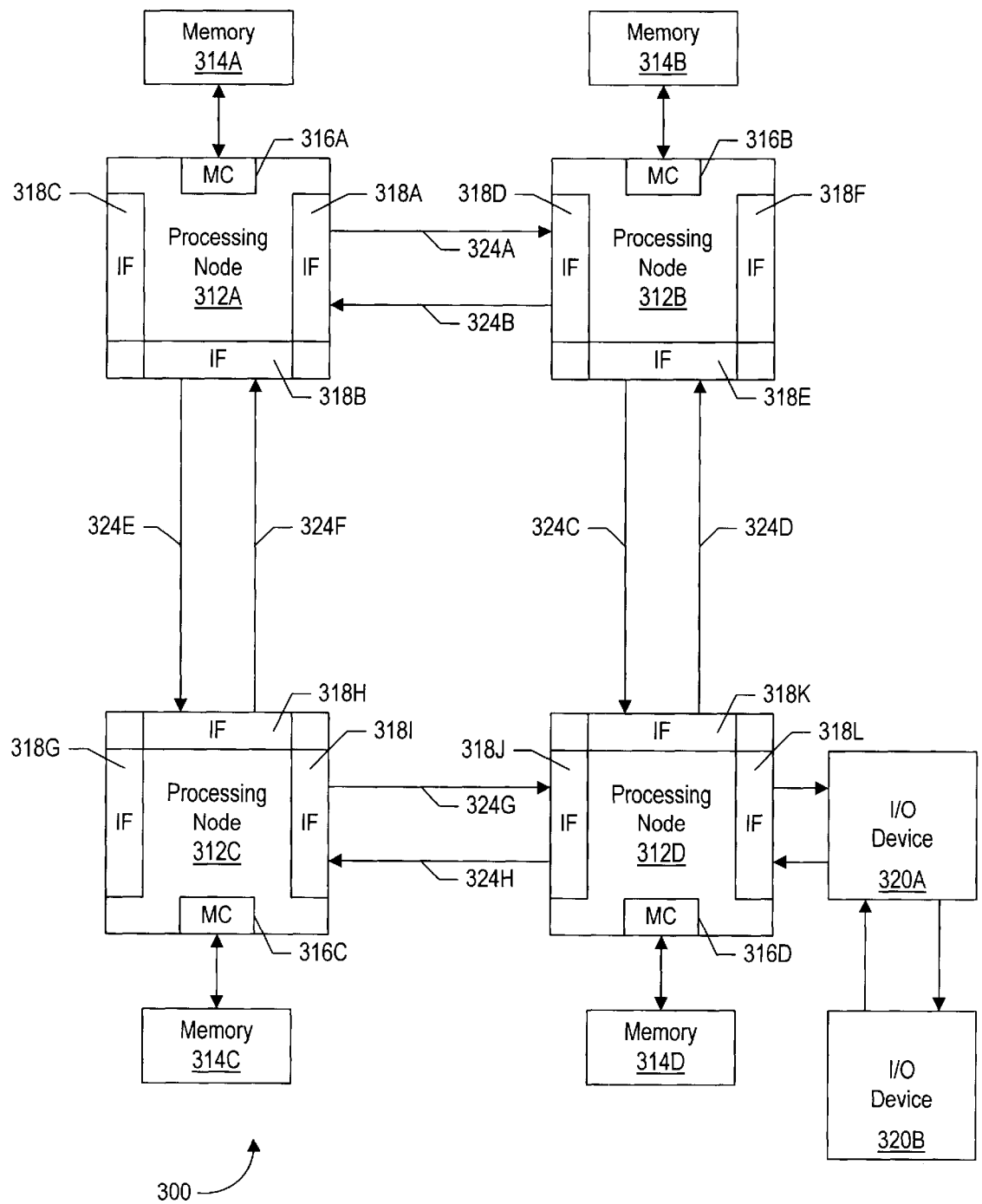
FIG. 12 is a block diagram of another embodiment of a computer system including the processor shown in FIG. 1.

Turning now to FIG. 12, another embodiment of a computer system 300 is shown. Other embodiments are possible and contemplated. In the embodiment of FIG. 12, computer system 300 includes several processing nodes 312A, 312B, 312C, and 312D. Each processing node is coupled to a respective memory 314A–314D via a memory controller 316A–316D included within each respective processing node 312A–312D. Additionally, processing nodes 312A–312D include interface logic used to communicate between the processing nodes 312A–312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g. devices 320A–320B in a daisy chain configuration) via interface logic 318L. Other processing nodes may communicate with other I/O devices in a similar fashion.

Processing nodes 312A–312D implement a packet-based link for inter-processing node communication. In the present embodiment, the link is implemented as sets of unidirectional lines (e.g. lines 324A are used to transmit packets from processing node 312A to processing node 312B and lines 324B are used to transmit packets from processing node 312B to processing node 312A). Other sets of lines 324C–324H are used to transmit packets between other processing nodes as illustrated in FIG. 12. Generally, each set of lines 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 12. Any suitable routing algorithm may be used. Other embodiments of computer system 300 may include more or fewer processing nodes then the embodiment shown in FIG. 12.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A–312D, in addition to a memory controller and interface logic, may include one or more processors. Broadly speaking, a processing node comprises at least one processor and may optionally include a memory controller for communicating with a memory and other logic as desired. More particularly, each processing node 312A–312D may comprise one or more copies of processor 10. External interface unit 18 may includes the interface logic 318 within the node, as well as the memory controller 316.

Memories 314A–314D may comprise any suitable memory devices. For example, a memory 314A–314D may comprise one or more RAMBUS DRAMs (RDRAMs), synchronous DRAMs (SDRAMs), static RAM, etc. The address space of computer system 300 is divided among memories 314A–314D. Each processing node 312A–312D may include a memory map used to determine which addresses are mapped to which memories 314A–314D, and hence to which processing node 312A–312D a memory request for a particular address should be routed. In one embodiment, the coherency point for an address within computer system 300 is the memory controller 316A–316D coupled to the memory storing bytes corresponding to the address. In other words, the memory controller 316A–316D is responsible for ensuring that each memory access to the corresponding memory 314A–314D occurs in a cache coherent fashion. Memory controllers 316A–316D may comprise control circuitry for interfacing to memories 314A–314D. Additionally, memory controllers 316A–316D may include request queues for queuing memory requests.

Generally, interface logic 318A–318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A–320B may be any suitable I/O devices. For example, I/O devices 320A–320B may include network interface cards, video accelerators, audio cards, hard or floppy disk drives or drive controllers, SCSI (Small Computer Systems Interface) adapters and telephony cards, modems, sound cards, and a variety of data acquisition cards such as GPIB or field bus interface cards.

Numerous variations and modifications will become apparent to those skilled in the art once the above disclosure is fully appreciated. It is intended that the following claims be interpreted to embrace all such variations and modifications.

What is claimed is:

1. A processor comprising:
    a first register configured to store a segment selector identifying a segment descriptor including a first base address;
    a second register including a second base address;
    an address generation unit;
    wherein said processor is configured to establish an operating mode responsive to an enable indication, a first operating mode indication, and a second operating mode indication, wherein said address generation unit is configured to generate a virtual address, wherein said virtual address is generated using said first base address in response to said operating mode corresponding to a first mode, and wherein said virtual address is generated using said second base address in response to said operating mode corresponding to a second mode.

2. The processor of claim 1, wherein said second base address comprises all zeros.

3. The processor of claim 1, wherein a first address size in said first mode is 32 or fewer bits, and wherein a second address size in said second mode is greater than 32 bits.

4. The processor of claim 1, wherein said address generation unit comprises:
    a first adder; and
    a second adder coupled to said first adder;
    wherein in response to said operating mode corresponding to said first mode:
        said first adder is configured to add said first base address to a displacement value to generate a first intermediate result and said second adder is configured to add said first intermediate result to a first base value and a first index value to generate said virtual address;
    wherein in response to said operating mode corresponding to said second mode:
        said first adder is configured to add a first portion of said second base address to said displacement value to generate a second intermediate result and said second adder is configured to add a concatenation of said second intermediate result and a second portion of said second base address to a second base value and a second index value to generate said virtual address.

5. The processor of claim 4,
    wherein in response to said operating mode corresponding to said first mode:
        said first adder is configured to generate said first intermediate result in a first clock cycle and said second adder is configured to generate said virtual address in a second clock cycle immediately following said first clock cycle;
    wherein in response to said operating mode corresponding to said second mode:
        said first adder is configured to generate said second intermediate result in said first clock cycle and said second adder is configured to generate said virtual address in said second clock cycle.

6. The processor of claim 5, wherein said first base value and said first index value each comprise 32 or fewer bits, and wherein said second base value and said second index value each comprise greater than 32 bits.

7. The processor of claim 6,
    wherein in response to said operating mode corresponding to said first mode:
        said virtual address comprises 32 or fewer bits;
    wherein in response to said operating mode corresponding to said second mode:
        said virtual address comprises greater than 32 bits.

8. The processor of claim 1, wherein a prefix of said instruction can change said operating mode from said first mode to said second mode or from said second mode to said first mode.

9. The processor of claim 1, wherein said second register comprises a non-architected register.

10. A method comprising:
    determining whether a processor is operating in a first mode according to a first mode indication, a second mode indication, and an enable indication;
    generating a virtual address corresponding to an instruction using a first base address from a first register in response to said processor not operating in said first mode; and
    generating said virtual address using a second base address from a second register in response to said processor operating in said first mode.

11. The method of claim 10, wherein said second base address comprises all zeros.

12. The method of claim 10, wherein a first address size in said first mode is 32 or fewer bits, and wherein a second address size in said second mode is greater than 32 bits.

13. The method of claim 10,
    wherein said generating said virtual address using said first base address comprises:
        adding said first base address to a displacement value to generate a first intermediate result; and
        adding said first intermediate result to a first base value and a first index value to generate said virtual address;
    wherein said generating said virtual address using said second base address comprises:
        adding a first portion of said second base address to said displacement value to generate a second intermediate result; and
        adding a concatenation of said second intermediate result and a second portion of said second base address to a second base value and a second index value to generate said virtual address.

14. The method of claim 13, wherein said
wherein said generating said virtual address using said first base address further comprises:
generating said first intermediate result in a first clock cycle; and
generating said virtual address in a second clock cycle immediately following said first clock cycle;
wherein said generating said virtual address using said second base address further comprises:
generating said second intermediate result in said first clock cycle; and
generating said virtual address in said second clock cycle.

15. The method of claim 14, wherein said first base value and said first index value each comprise 32 or fewer bits, and wherein said second base value and said second index value each comprise greater than 32 bits.

16. The method of claim 15,
wherein in response to said processor not operating in said first mode:
said virtual address comprises 32 or fewer bits;
wherein in response to said processor operating in said first mode:
said virtual address comprises greater than 32 bits.

17. The method of claim 10, further comprising:
changing said operating mode from said first mode to said second mode or from said second mode to said first mode in response to a prefix of said instruction.

18. The method of claim 10, wherein said second register comprises a non-architected register.

19. A computer system comprising:
a microprocessor including:
a first register configured to store a segment selector identifying a segment descriptor including a first base address;
a second register including a second base address;
an address generation unit;
wherein said processor is configured to establish an operating mode responsive to an enable indication, a first operating mode indication, and a second operating mode indication, wherein said address generation unit is configured to generate a virtual address, wherein said virtual address is generated using said first base address in response to said operating mode corresponding to a first mode, and wherein said virtual address is generated using said second base address in response to said operating mode corresponding to a second mode; and
an input/output (I/O) device coupled to said microprocessor and to another computer system, wherein said I/O device is configured to communicate between said microprocessor and said another computer system.

20. The computer system of claim 19, wherein said I/O device comprises a modem.

* * * * *